United States Patent [19]

Ito

[11] Patent Number: 5,022,021

[45] Date of Patent: Jun. 4, 1991

[54] APPARATUS FOR DETECTING MOVING DIRECTION OF LIGHT BEAM SPOT ILLUMINATED ON OPTICAL INFORMATION RECORDING MEDIUM HAVING TRACKS

[75] Inventor: Kenichi Ito, Hachioji, Japan

[73] Assignee: Olympus Optical Co., Ltd., Tokyo, Japan

[21] Appl. No.: 469,336

[22] Filed: Jan. 24, 1990

[30] Foreign Application Priority Data

Jan. 27, 1989 [JP] Japan .................................. 1-16359

[51] Int. Cl.⁵ .............................................. G11B 7/00
[52] U.S. Cl. .............................. 369/44.11; 369/44.13; 369/43
[58] Field of Search ............... 369/44.11, 44.12, 44.13, 369/44.14, 44.28, 44.32, 44.25, 44.33

[56] References Cited

U.S. PATENT DOCUMENTS

| | | | |
|---|---|---|---|
| 4,539,664 | 9/1985 | Deguchi et al. | 369/44.28 |
| 4,740,940 | 4/1988 | Tanaka et al. | 369/44.32 |
| 4,751,695 | 6/1988 | Kaku et al. | 369/44.13 |
| 4,797,872 | 1/1989 | Rokutan | 369/44.26 |
| 4,866,688 | 9/1989 | Ohtake et al. | 369/44.13 |

Primary Examiner—Roy N. Envall, Jr.
Assistant Examiner—Thai Tarn
Attorney, Agent, or Firm—Stevens, Davis, Miller & Mosher

[57] ABSTRACT

An apparatus for detecting a moving direction of a light beam spot illuminated on an optical information recording medium having tracks, in which moving direction identifying signals are obtained in synchronized with a leading edge and a trailing edge of a tracking error signal and a prohibit signal for prohibiting to write and rewrite information of the moving direction of the light beam spot is generated in accordance with the moving direction identifying signals. In the apparatus according to the invention, writing and rewriting the information of the moving direction of the light beam spot is prohibited when the two moving direction identifying signals denote opposite moving directions, so that the moving direction of the light beam spot on the optical information recording medium can be detected without being influenced by a prepit, a dust or a flaw formed in the optical information recording medium.

7 Claims, 3 Drawing Sheets

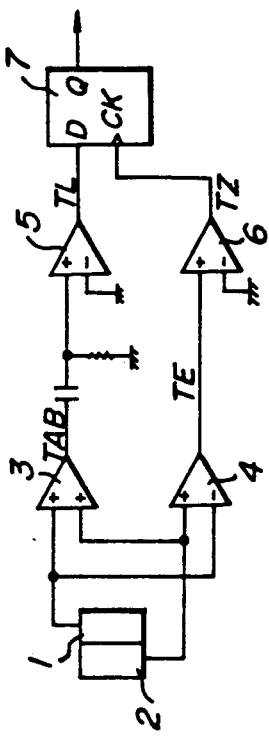
FIG. 1 (PRIOR ART)
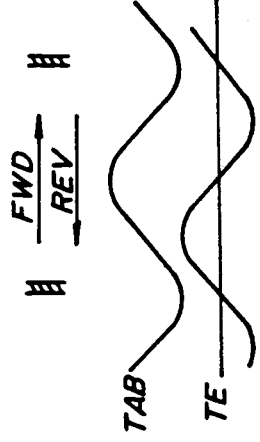
FIG. 2A (PRIOR ART)
FIG. 2B (PRIOR ART)
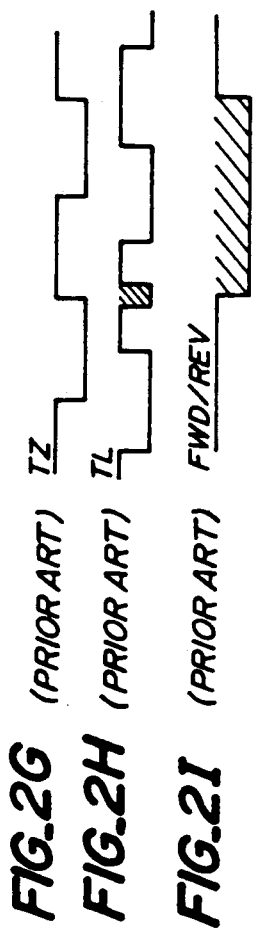
FIG. 2C (PRIOR ART)
FIG. 2D (PRIOR ART)
FIG. 2E (PRIOR ART)
FIG. 2F (PRIOR ART)
FIG. 2G (PRIOR ART)
FIG. 2H (PRIOR ART)
FIG. 2I (PRIOR ART)

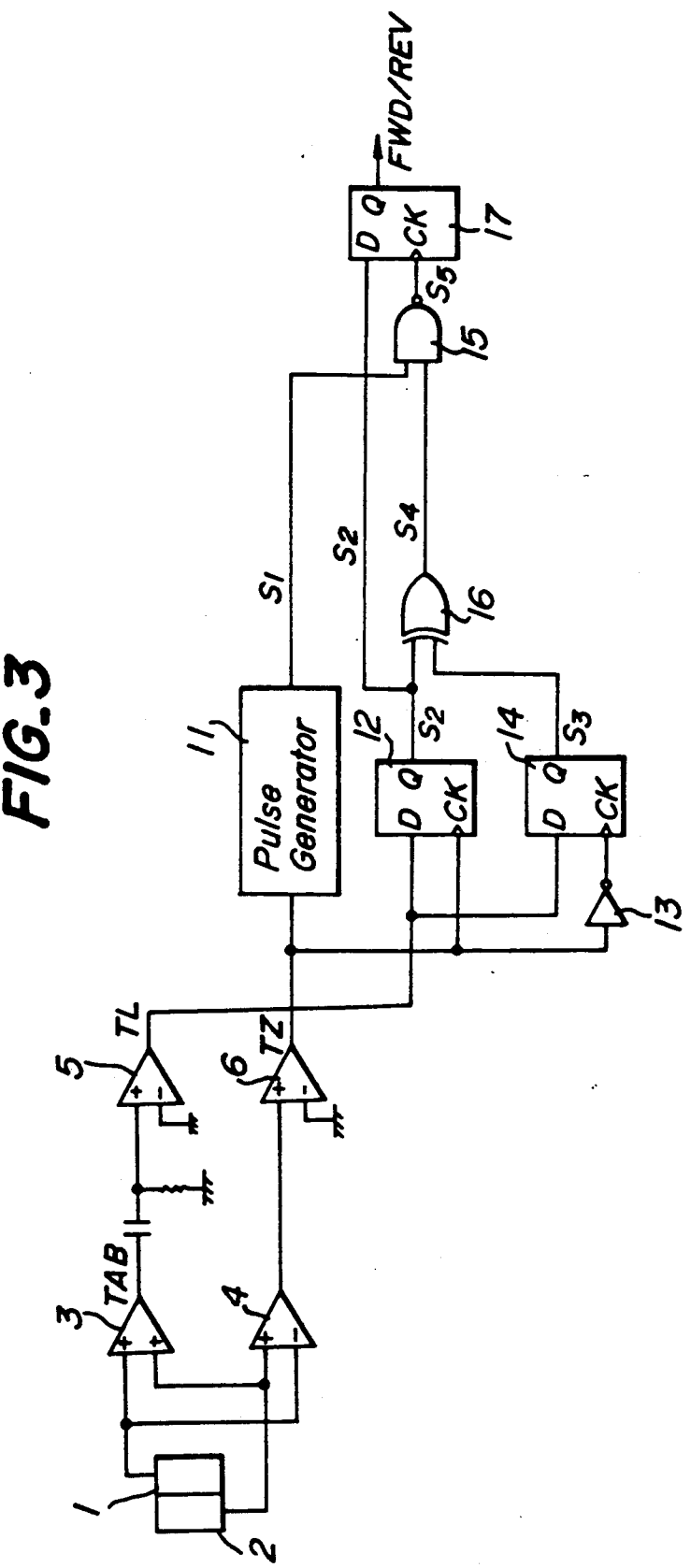

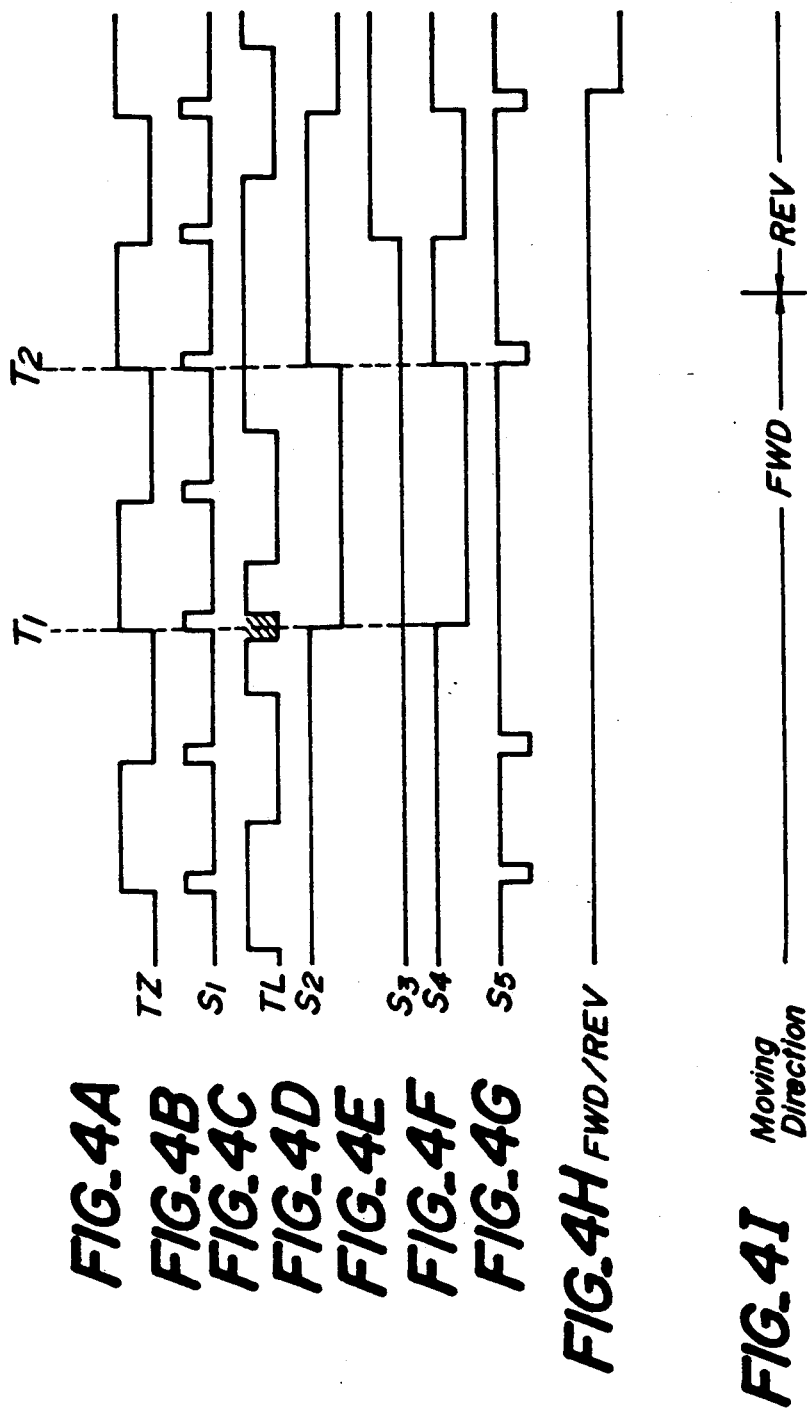

APPARATUS FOR DETECTING MOVING DIRECTION OF LIGHT BEAM SPOT ILLUMINATED ON OPTICAL INFORMATION RECORDING MEDIUM HAVING TRACKS

BACKGROUND OF THE INVENTION

Field of the Invention and Related Art Statement

The present invention relates to an apparatus for detecting a moving direction of a light beam spot illuminated on an optical information recording medium having tracks formed thereon, such as an optical card and an optical disc.

In an optical information recording and/or reproducing device, optical information is written and reproduced by illuminating a light beam spot on the track formed on the optical information recording medium. In order to correctly write and read the optical information on the optical information recording medium, it is necessary to scan the track by the light beam spot accurately. For this purpose, in the known apparatus, a deviation amount of the light beam spot from the track is detected to obtain a tracking error signal and the position of the light beam spot on the recording medium is adjusted in accordance with the deviation amount of the light beam spot. That is to say, a tracking servo operation is effected in accordance with the tracking error signal.

However, in the known apparatus, the tracking servo operation is effected by processing only the tracking error signal. Therefore, if some external force is applied to the optical information recording medium, the light beam spot could not follow the track accurately. Further, in a seek operation mode in which the light beam spot is moved across successive tracks at a high speed into a desired track, a long time is required to obtain a stable tracking servo operation.

In a known information recording and/or reproducing apparatus disclosed in Japanese Patent Laid-open Publication No. 63-179476, the above problem is solved such that the moving speed and direction of the light beam spot moving in a tracking direction perpendicular to the direction of the track are detected and the tracking servo operation is started promptly in accordance with the thus detected moving speed and direction of the light beam spot.

FIG. 1 is a block diagram showing the construction of the known apparatus for detecting a moving direction of a light beam spot disclosed in the above Japanese Patent Laid-open Publication No. 63-179476, and FIGS. 2A to 2I are signal waveforms appearing at various points in the apparatus shown in FIG. 1. In this known apparatus, three light beams are projected on the optical information recording medium, a main light beam among said three light beams being used to write or read the information and the remaining two sub light beams being projected for detecting the tracking error. In order to detect the tracking error, there are provided two photo detectors 1 and 2 for detecting intensities of said two sub light beams reflected from the optical information recording medium. The outputs from the photo detectors 1 and 2 are supplied to an adding circuit 3 and a subtracting circuit 4 to obtain a deviation amount signal TAB (FIG. 2A) from the adding circuit 3 and to obtain a tracking error signal TE (FIG. 2B) from the subtracting circuit 4, respectively. The signal TAB represents a deviation amount of the light beam spot from the track and the signal TE a deviation amount and direction of the light beam spot from the track. The signal TAB is further supplied to a first comparator 5 and the signal TE to a second comparator 6, respectively. In these comparators 5 and 6, the deviation amount signal TAB and the tracking error signal TE are compared with predetermined values to produce a bivalent signal TL and a bivalent signal TZ, respectively as shown in FIGS. 2C to 2D. The bivalent signals TL and TZ are supplied to D input terminal and clock terminal CK of a D flip-flop 7, respectively. In the D flip-flop 7, the signal TL is synchronized with the leading edge of the signal TZ to produce a moving direction signal FWD/REV from an output terminal Q of the D flip-flop 7. It should be noted that when the light beam spot moves in the forward direction the moving direction signal becomes low, and when the light beam spot moves in the reverse direction the moving direction signal becomes high.

However, the known apparatus has a problem as will be explained below.

On the track formed on the optical information recording medium, a prepit such as sector information is preliminarily recorded. When the light beam spot passes over the prepit, the level of signal TL becomes temporarily low as shown in FIG. 2H by the cross-hatched area. If the undesired low level signal is generated in synchronism with the leading edge of the signal TZ (FIG. 2G), the moving direction signal FWD/REV is inverted from a high level to a low level as shown in FIG. 2I, although the actual moving direction of the light beam spot is not reversed. While the level of the moving direction signal FWD/REV is kept low, the servo system operates in as the positive feed back mode and thus the relative moving speed between the light beam spot and the track is accelerated. Therefore, a problem results in that a long time is required to pull back the tracking servo operation into a stable condition. It should be noted that if a dust particle is present on the information recording medium or a flaw is formed therein, the same problem would occur.

SUMMARY OF THE INVENTION

An object of the present invention is to provide an apparatus for detecting the deviation direction of the light beam spot illuminated on an information recording medium having tracks formed thereon, in which the moving direction of the light beam spot in the tracking direction can be always detected correctly without being influenced by a prepit, dust or a flaw of any type formed on the information recording medium, so that the tracking servo operation can be promptly initiated in a stable manner.

In order to carry out the above mentioned object, an apparatus for detecting a moving direction of a light beam spot illuminated on an optical information recording medium having tracks formed thereon comprises:

tracking information generating means for generating a tracking information signal representing a position of the light beam spot relative to a track formed on the optical information recording medium;

operating means for receiving said tracking information signal and for generating two moving direction identifying signals for identifying a moving direction of the light beam spot on the optical information recording medium at different timings of the tracking information signal and a prohibit signal for prohibiting to identify the moving direction of the light beam spot when said two moving direction identifying signals indicate opposite directions; and judging means for generating a moving direction detection signal denoting the moving direction of light beam spot which is denoted by one of said two moving direction identifying signals, said moving direction denoted by the moving direction detection signal being not changed when the prohibit signal is existent.

BRIEF DESCRIPTION OF THE DRAWINGS

FIG. 1 is a block diagram showing the construction of the conventional apparatus for detecting the moving direction of the light beam spot illuminated on the optical information recording medium;

FIGS. 2A to 2I are waveforms for explaining the operation of the conventional apparatus shown in FIG. 1;

FIG. 3 is a block diagram illustrating the construction of the apparatus according to an embodiment of the present invention; and FIGS. 4A to 4I are waveforms for explaining the operation of the apparatus illustrated in FIG. 3.

DETAILED DESCRIPTION OF THE PREFERRED EMBODIMENT

FIG. 3 is a block diagram illustrating the construction of the apparatus according to an embodiment of the invention. It should be noted that portions which are the same as those of the known apparatus shown in FIG. 1 are denoted by the same reference numerals and explanation thereof is omitted.

In this embodiment, the bivalent signal TZ is supplied to a pulse generator 11 and to a clock input terminal CK of a D flip-flop 12. The signal TZ is further supplied to a clock input terminal CK of a d flip-flop 14 via an inverter 13. In the pulse generator 11, a pulse signal S1 is produced in synchronism with the leading edge and a trailing edge of the signal TZ (FIG. 4B) and the pulse signal S1 is then supplied to one of the input terminals of a NAND circuit 15.

On the other hand, the bivalent signal TL is supplied to input terminals D of the D flip-flop 12 and D flip-flop 14. Signals TZ and TL constitute tracking information signals. In the D flip-flop 12, the signal TL is synchronized with the leading edge of the signal TZ to generate a first deviation amount detection signal S2 (first moving direction signal) from an output terminal Q of the D flip-flop 12. Similarly, in the D flip-flop 14, the signal TL is synchronized with the trailing edge of the inverted signal TZ, to generate a second deviation amount detection signal S3 (second moving direction signal) from an output terminal Q of the D flip-flop 14. The first deviation amount detection signal S2 is directly supplied to a flip-flop 17 for identifying the direction of the deviation of the light beam spot from the track as well as to an exclusive OR circuit 16. To the exclusive OR circuit 16, the second deviation amount detection signal S3 is also supplied to produce a prohibit signal S4 for prohibiting the rewriting of the first deviation amount detection signal S2 stored in the flip-flop 17. The prohibit signal S4 generated in the exclusive OR circuit 16 is supplied to the other input terminal of the NAND circuit 15. In the NAND circuit 15, when the prohibit signal S4 has the high level a pulse signal S5 whose phase is inversed from that of the pulse signal S1 supplied from the pulse generator 11 is produced (FIG. 4G), but when the prohibit signal S4 is in the low level, the NAND circuit 15 produces a high output (see FIGS. 4F and 4G) regardless of whether S1 is high or low. To an input terminal D of the flip-flop 17, is supplied the first deviation amount detection signal S2, and to a clock terminal CK of the flip-flop 17, is supplied the pulse signal S5 from an output terminal of the NAND circuit 15. And a deviation direction detection signal FWD/REV is obtained from an output terminal Q of the flip-flop 17 in accordance with the first deviation amount detection signal S2 and the pulse signal S5.

The operation of the apparatus according to this embodiment is explained as follows with reference to the waveforms shown in FIGS. 4A to 4I. It should be noted that arrows in FIG. 4I represent the actual moving direction of the light beam spot, and the hatched portion in the waveform of the signal TL (FIG. 4C) shows that the level of the signal TL is decreased by an undesired decrease of the light intensity which is caused by the prepit etc. formed on the track of the optical information recording medium.

When the moving direction of the light beam spot is correctly detected the D flip-flops 12 and 13, the levels of the signals S2 and S3 do not become equal to each other (S2≠S3) as shown in FIGS. 4D and 4E, so that the level of the signal S4 is kept high. From the output terminal of the NAND circuit 15, the pulse S5 is supplied to the input terminal CK of the flip-flop 17, and the signal S2 is rewritten in the flip-flop 17 in synchronism with the leading edge of the pulse S5 supplied from the NAND circuit 15. Therefore, the level of the signal FWD/REV is equal to that of the signal S2 as illustrated in FIG. 4H.

On the other hand, when the undesired low level signal, is generated in the signal TL as shown by the hatched portion of FIG. 4C and during this undesired low level signal the leading edge of the signal TZ (FIG. 4A) appears, the level of the signal S2 temporarily becomes low at the timing T1. During the time period between the timings T1 and T2, although the moving direction of the light beam spot is not reversed, the level of the signal S2 becomes equal to the level of the signal S3 (S2=S3). Therefore, the level of the prohibit signal S4 becomes low as depicted in FIG. 4F, and the NAND circuit 15 does not supply the output pulse to the flip-flop 17. During the time period between T1 and T2, rewriting the signal S2 in the flip-flop 17 is prohibited, so that the moving direction detection signal FWD/REV derived from the output terminal Q of the flip-flop 17 is kept high.

As explained above, in the present invention, even if a prepit, etc. is formed on the track of the optical information recording medium, the moving direction of the light beam spot on the track can be correctly detected, so that the compensation for the position of the light beam spot with respect to the track formed on the optical information recording medium is promptly effected in a stable manner.

The present invention is not limited to the above mentioned embodiment, but many modifications can be applied to the invention. For instance, it is possible to obtain the FWD/REV signal by directly processing the prohibit signal S4 or processing a delayed prohibit signal to control to rewrite the signal S2 in the flip-flop 17 without using the pulse generator 11 and the NAND circuit 15.

What is claimed is:

1. An apparatus for detecting a moving direction of a light beam spot illuminated on an optical information recording medium having recording tracks formed thereon, said apparatus comprising:

tracking information generating means for generating a pair of tracking information signals representing a position of the light beam spot relative to at least one of said tracks formed on the optical information recording medium;

operating means, responsive to said tracking information signals, for generating (i) two moving direction identifying signals for identifying a moving direction of the light beam spot on the optical information recording medium at different timings of the tracking information signals and (ii) a prohibit signal responsive to said moving direction identifying signals indicating simultaneously opposite moving directions of said light beam spot; and judging means for generating a moving direction detection signal denoting the moving direction of the light beam spot, said moving direction detection signal (i) corresponding to a given one of said two moving direction identifying signals except when the prohibit signal is present and (ii) being unchanged by a change in said given one of said two moving direction identifying signals when the prohibit signal is present.

2. An apparatus as claimed in claim 1, wherein:
said tracking information signals include a tracking error signal representing a deviation amount and direction of said light beam spot from said one of said tracks and a deviation amount signal representing the deviation amount of said light beam spot from the track, and said tracking information generating means includes means for converting said tracking error signal and said deviation amount signal into first and second bivalent signals respectively.

3. An apparatus as claimed in claim 2, wherein:
said operating means comprises means for providing a first one of said two moving direction identifying signals as a bivalent signal based on the second bivalent signal in synchronism with a leading edge of the first bivalent signal and a second one of said two moving direction identifying signals as a bivalent signal based on the second bivalent signal in synchronism with a trailing edge of the first bivalent signal, and means for producing said prohibit signal when said two moving direction identifying signals do not have the same signal level.

4. An apparatus as claimed in claim 3, wherein:
said judging means comprises means for writing and rewriting the moving direction detection signal based on said given one of said moving direction identifying signals supplied from the operating means in accordance with pulses which are synchronized with the leading edge and the trailing edge of the first bivalent signal, and wherein writing and rewriting of said moving direction detection signal is prohibited in accordance with the prohibit signal supplied from said operating means.

5. An apparatus as claimed in claim 3, wherein:
said operating means comprises first and second flip-flops for producing said two moving direction identifying signals, the first one of said moving direction identifying signals is produced in the first flip-flop in synchronism with the leading edges of the first bivalent signal, and the second one of said moving direction identifying signals is produced in the second flip-flop in synchronism with trailing edges of the first bivalent signal.

6. An apparatus as claimed in claim 5, wherein:
said operating means further comprises an exclusive OR circuit whose input terminals are connected to output terminals of said first and second flip-flops, and said prohibit signal is produced by the exclusive OR circuit in accordance with the first and second moving direction identifying signals supplied from said first and second flip-flops.

7. An apparatus as claimed in claim 7, wherein:
said judging means comprises a pulse generator for generating pulses in synchronism with the leading edge and the trailing edge of the first bivalent signal, a gate circuit for receiving said pulses supplied from said pulse generator and said prohibit signal supplied from the operating means and for generating clock pulses when the prohibit signal is not supplied from said operating means, and a third flip-flop for receiving said deviation direction identifying signal from said operating means and said clock pulses from said gate circuit, and for writing and rewriting said given one of said moving direction identifying signals in accordance with the clock pulses to produce said moving direction detection signal.

* * * * *